(12) United States Patent
Kim et al.

(10) Patent No.: US 10,741,848 B2
(45) Date of Patent: Aug. 11, 2020

(54) COPPER FOIL HAVING IMPROVED ADHESIVE FORCE, ELECTRODE INCLUDING THE SAME, SECONDARY BATTERY INCLUDING THE SAME, AND METHOD OF MANUFACTURING THE SAME

(71) Applicant: LS MTRON LTD., Anyang-si, Gyeonggi-do (KR)

(72) Inventors: Seung Min Kim, Anyang-si (KR); Shan Hua Jin, Anyang-si (KR)

(73) Assignee: KCF TECHNOLOGIES CO., LTD, Anyang-si, Gyeonggi-Do (KR)

(*) Notice: Subject to any disclaimer, the term of this patent is extended or adjusted under 35 U.S.C. 154(b) by 149 days.

(21) Appl. No.: 15/914,568

(22) Filed: Mar. 7, 2018

(65) Prior Publication Data

US 2018/0261850 A1 Sep. 13, 2018

(30) Foreign Application Priority Data

Mar. 9, 2017 (KR) .................. 10-2017-0029852

(51) Int. Cl.
*H01M 4/66* (2006.01)
*H01M 4/133* (2010.01)
*C25D 3/38* (2006.01)
*C25D 7/06* (2006.01)
*C25D 1/04* (2006.01)
(Continued)

(52) U.S. Cl.
CPC ............. *H01M 4/667* (2013.01); *C23C 22/37* (2013.01); *C25D 1/04* (2013.01); *C25D 1/20* (2013.01); *C25D 3/38* (2013.01); *C25D 5/04* (2013.01); *C25D 5/48* (2013.01); *C25D 7/0642* (2013.01); *H01M 4/133* (2013.01); *H01M 4/661* (2013.01); *C23C 2222/20* (2013.01); *H01M 4/13* (2013.01); *H01M 4/364* (2013.01); *H01M 4/483* (2013.01); *H01M 4/587* (2013.01); *H01M 10/0525* (2013.01); *H01M 2004/027* (2013.01)

(58) Field of Classification Search
CPC .............................. H01M 4/667; C23C 22/24
See application file for complete search history.

(56) References Cited

U.S. PATENT DOCUMENTS

| 2010/0136434 A1* | 6/2010 | Hanafusa | .................. | C22F 1/00 |
| | | | | 429/245 |
| 2014/0017564 A1* | 1/2014 | Suzuki | ..................... | C25D 3/38 |
| | | | | 429/211 |
| 2017/0196083 A1* | 7/2017 | Miki | ........................ | H05K 1/09 |

FOREIGN PATENT DOCUMENTS

| CN | 101067210 A | 11/2007 |
| CN | 103402757 A | 11/2013 |

(Continued)

OTHER PUBLICATIONS

Taiwanese Office Action for related Taiwanese Application No. 107107101; action dated Oct. 30, 2018; (9 pages).
(Continued)

*Primary Examiner* — Maria Laios
(74) *Attorney, Agent, or Firm* — K&L Gates LLP

(57) ABSTRACT

Provided is a copper foil. The copper foil includes a copper layer and a protective layer disposed on the copper layer, wherein a surface of the protective layer has a maximum height roughness ($R_{max}$) of 0.6 μm to 3.5 μm, a peak density (PD) of 5 to 110, and an oxygen atomic amount of 22 at % (atomic %) to 67 at %.

10 Claims, 5 Drawing Sheets

(51) Int. Cl.
    *C23C 22/37*     (2006.01)
    *C25D 5/04*     (2006.01)
    *C25D 5/48*     (2006.01)
    *C25D 1/20*     (2006.01)
    *H01M 4/13*     (2010.01)
    *H01M 4/587*     (2010.01)
    *H01M 4/48*     (2010.01)
    *H01M 4/02*     (2006.01)
    *H01M 10/0525*     (2010.01)
    *H01M 4/36*     (2006.01)

(56) References Cited

FOREIGN PATENT DOCUMENTS

| | | |
|---|---|---|
| CN | 104099652 A | 10/2014 |
| JP | 2012151106 A | 8/2012 |
| JP | 2016537514 A | 12/2016 |
| JP | 2017079208 A | 4/2017 |
| JP | 2018032624 A | 3/2018 |
| JP | 2018519633 A | 7/2018 |
| KR | 1020140003511 | 1/2014 |
| KR | 1020150086222 | 7/2015 |
| KR | 1020170000761 A | 3/2017 |
| WO | 2017018232 A1 | 2/2017 |

OTHER PUBLICATIONS

Notice of Allowance for related Japanese Application No. 2018-029281; action dated Sep. 10, 2019; (2 pages).

\* cited by examiner

COPPER FOIL HAVING IMPROVED ADHESIVE FORCE, ELECTRODE INCLUDING THE SAME, SECONDARY BATTERY INCLUDING THE SAME, AND METHOD OF MANUFACTURING THE SAME

CROSS-REFERENCE TO RELATED APPLICATION

Pursuant to 35 U.S.C. § 119(a), this application claims the benefit of earlier filing date and right of priority to Korean Patent Application No. 10-2017-0029852, filed on Mar. 9, 2017, the disclosure of which is incorporated herein by reference in its entirety.

BACKGROUND

1. Field of the Invention

The present invention relates to a copper foil having an improved adhesive force, an electrode including the same, a secondary battery including the same, and a method of manufacturing the same.

2. Discussion of Related Art

A secondary battery is a type of energy conversion device that converts electrical energy into chemical energy, stores the chemical energy, and generates electricity by converting the chemical energy into electrical energy when the electricity is needed, and is referred to as a "rechargeable battery."

Lead-acid batteries, nickel cadmium secondary batteries, nickel hydrogen secondary batteries, lithium secondary batteries, and the like are secondary batteries. Among them, the lithium secondary batteries may store a relatively large amount of energy relative to a size and weight thereof in comparison to other secondary batteries. Therefore, in the field of information communication devices in which portability and mobility are important, the lithium secondary batteries are preferred and an application range thereof is also expanding to energy storage devices for hybrid vehicles and electric vehicles.

Recently, in order to increase a capacity of a secondary battery, metal-based active materials containing tin or silicon are being used as an anode active material. Since the metal-based active material has a large volume expansion rate during charging and discharging, there is a problem in that the metal-based active material is easily separated from a copper foil, which is a current collector of an anode, in comparison to a conventional carbon-based active material, and a lifetime of a battery is shortened by such separation. In order to address the problem, it is necessary to increase an adhesive force between a copper foil and an active material.

A method of increasing an adhesive force between a copper foil and an anode active material includes a method of increasing a surface roughness of a copper foil. However, simply increasing a surface roughness of a copper foil has a limitation in increasing an adhesive force between a copper foil and an anode active material, and thus a required adhesive force may not be obtained.

SUMMARY OF THE INVENTION

Therefore, the present invention is directed to providing a copper foil capable of preventing problems caused by limitations and disadvantages of the related art, an electrode including the same, a secondary battery including the same, and a method of manufacturing the same.

In addition, an embodiment of the present invention is directed to providing a copper foil having an improved adhesive force with an active material by improving physical and chemical properties of a surface of the copper foil.

Further, another embodiment of the present invention is directed to providing a copper foil having an improved adhesive force by adjusting a maximum height roughness, a peak density, and an oxygen atomic amount of a surface of the copper foil.

Further, still another embodiment of the present invention is directed to providing a secondary battery electrode including a copper foil having an improved adhesive force with an active material.

Further, yet another embodiment of the present invention is directed to providing a secondary battery including such a secondary battery electrode.

Further, yet another embodiment of the present invention is directed to providing a method of manufacturing a copper foil having an improved adhesive force with an active material.

In addition to the above-described aspects of the present invention, other features and advantages of the present invention will be described below or will become apparent to those skilled in the art from the following description.

To solve the above problems, the present invention may include the following configurations.

According to an aspect of the present invention, there is provided a copper foil including a copper layer and a protective layer disposed on the copper layer, wherein a surface of the protective layer has a maximum height roughness ($R_{max}$) of 0.6 μm to 3.5 μm, a peak density (PD) of 5 to 110, and an oxygen atomic amount of 22 at % (atomic %) to 67 at %.

The protective layer may include at least one of chromium, a silane compound, and a nitrogen compound.

The copper foil may have a yield strength of 25 kgf/mm² or more at a room temperature of 25±15° C.

The copper foil may have an elongation of 2% or more at a room temperature of 25±15° C.

The copper foil may have a yield strength ratio of 0.55 kgf/mm² or more represented by the following Equation 1.

Yield strength ratio(kgf/mm²)=Yield strength(kgf/mm²)×Elongation value. [Equation 1]

Here, the elongation value has no unit.

The copper foil may have a thickness of 4 μm to 30 μm.

According to another aspect of the present invention, there is provided a secondary battery electrode including a copper foil and an active material layer disposed on the copper foil, wherein the copper foil includes a copper layer and a protective layer disposed between the copper layer and the active material layer, and a surface of the copper foil has a maximum height roughness ($R_{max}$) of 0.6 μm to 3.5 μm, a peak density (PD) of 5 to 110, and an oxygen atomic amount of 22 at % to 67 at %.

The protective layer may include at least one of chromium, a silane compound, and a nitrogen compound.

The copper foil may have a yield strength of 25 kgf/mm² or more at a room temperature of 25±15° C.

The copper foil may have an elongation of 2% or more at a room temperature of 25±15° C.

The copper foil may have a yield strength ratio of 0.55 kgf/mm² or more.

The copper foil may have a thickness of 4 μm to 30 μm.

According to still another aspect of the present invention, there is provided a secondary battery including a cathode, an anode including the above-described secondary battery electrode, an electrolyte configured to provide an environment in which lithium ions move between the cathode and the anode, and a separator configured to electrically insulate the cathode from the anode.

According to still another aspect of the present invention, there is provided a method of manufacturing a copper foil including forming a copper layer by running a current having a density of 40 to 80 A/dm$^2$ from a positive electrode plate to a rotating negative electrode drum which are disposed to be spaced apart from each other in an electrolytic solution containing copper ions, immersing the copper layer in an antirust solution containing chromium (Cr), and forming a protective layer on the copper layer, wherein the antirust solution has a pH of 1.5 to 4.2 and a dissolved oxygen amount of less than 5 ppm.

The electrolytic solution may contain 70 to 90 g/L of copper ions and 80 to 120 g/L of sulfuric acid.

Total inorganic carbon (TIC) in the electrolytic solution may be 0.05 g/L or less.

A concentration of iron (Fe) ions in the electrolytic solution may be 0.30 g/L or less.

The forming of the copper layer may include filtering the electrolytic solution using activated carbon.

The forming of the copper layer may include performing ozone ($O_3$) treatment on the electrolytic solution.

The forming of the copper layer may include introducing hydrogen peroxide and air into the electrolytic solution.

The forming of the copper layer may include performing heat treatment on a copper wire, pickling the heat-treated copper wire, and introducing the pickled copper wire into sulfuric acid for an electrolytic solution.

In the heat treatment of the copper wire, the copper wire may be heat-treated at 600 to 900° C. for 30 to 60 minutes.

The chromium (Cr) in the antirust solution may have a concentration of 1.5 to 3.0 g/L.

The general description of the present invention as described above is intended merely to illustrate or explain the present invention, and does not limit the scope of the present invention.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
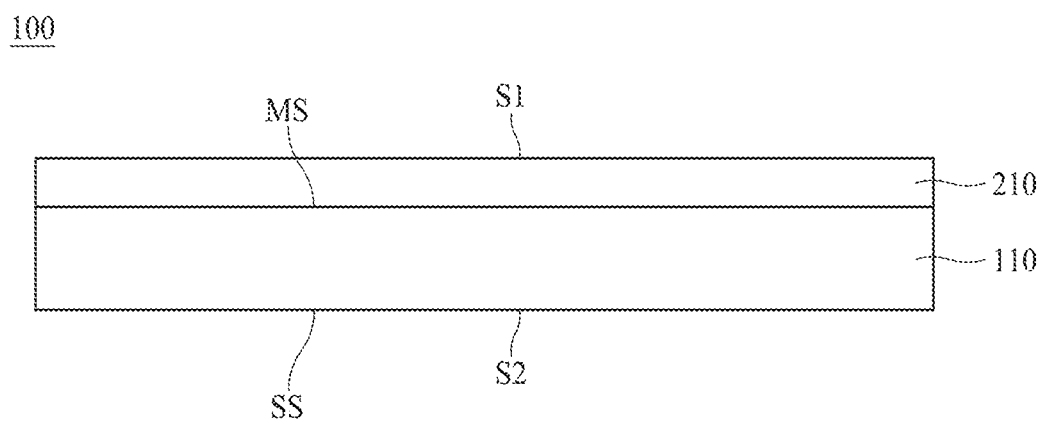
FIG. 1 is a schematic cross-sectional view of a copper foil according to an embodiment of the present invention.

Hereinafter, embodiments of the present invention will be described in detail with reference to the accompanying drawings.

It should be apparent to those skilled in the art that various modifications and alterations may be made in the present invention without departing from the spirit and scope of the present invention. Therefore, the present invention includes all modifications and alterations that come within the scope of the present invention as defined in the appended claims and equivalents thereof.

Shapes, sizes, ratios, angles, numbers, and the like shown in the accompanying drawings to describe embodiments of the present invention are merely examples, and thus the present invention is not limited by configurations illustrated in the drawings. Like reference numerals throughout this specification may denote like elements.

When terms such as "including," "having," "consist of," and the like are used herein, other portions may be added unless the terms are used with the term "only." An expression used in the singular may encompass the expression in the plural unless otherwise specifically indicated. In addition, in interpreting an element, it will be interpreted to include an error range even when there is no separate description.

In the case of a description of a positional relationship, for example, in the case in which a position relationship between two portions is described with the terms "on," "above," "under," "next to," or the like, one or more portions may be interposed therebetween unless the term "directly" is used in the expression.

In the case of a description of a temporal relationship, for example, in the case in which a temporal relationship between facts is described with the terms "after," "following," "next," "before," or the like, the facts may not be continuous unless the term "directly" is used in the expression.

It will be understood that, although the terms "first," "second," etc. may be used herein to describe various elements, these elements should not be limited by these terms. These terms are only used to distinguish one element from another. Therefore, a first element described below may be a second element within the technological scope of the present invention.

When the term "at least one" is used, it should be understood to include all possible combinations of one or more of the associated listed items.

It should be understood that each of features of various embodiments of the present invention may be partially or fully coupled or combined with each other, and may be technically variously communicated and driven. The embodiments may be independently performed or may be performed in communication with each other.

FIG. 1 is a schematic cross-sectional view of a copper foil 100 according to an embodiment of the present invention.

Referring to FIG. 1, the copper foil 100 includes a copper layer 110 and a protective layer 210 disposed on the copper layer 110.

The copper layer 110 according to the embodiment of the present invention has a matte surface MS and a shiny surface SS opposite the matte surface MS.

The copper layer 110 may be formed on a rotating negative electrode drum (see FIG. 8), for example, by electroplating. In this case, the shiny surface SS refers to a surface which comes into contact with the rotating negative electrode drum in the electroplating process, and the matte surface MS refers to a surface opposite the shiny surface SS.

Generally, the shiny surface SS has a lower surface roughness ($R_z$) than the matte surface MS, but the embodiment of the present invention is not limited thereto, and a surface roughness ($R_z$) of the shiny surface SS may be higher than or equal to a surface roughness ($R_z$) of the matte surface MS.

The protective layer 210 may be disposed on at least one of the matte surface MS and the shiny surface SS of the copper layer 110. Referring to FIG. 1, the protective layer 210 is disposed on the matte surface MS. However, the embodiment of the present invention is not limited thereto, and the protective layer 210 may be disposed only on the shiny surface SS or on both the matte surface MS and the shiny surface SS. The protective layer 210 disposed on the matte surface MS of the copper layer 110 is also referred to as a first protective layer.

The protective layer 210 protects the copper layer 110. The protective layer 210 may prevent the copper foil 100 from being oxidized or changed during a preservation process.

According to an embodiment of the present invention, the protective layer 210 includes at least one of chromium (Cr), a silane compound, and a nitrogen compound.

For example, the protective layer 210 may be made by an antirust solution containing chromium (Cr), for example, an antirust solution containing a chromate compound. The protective layer 210 has an antirust function and is also referred to as an antirust film.

Further, the protective layer 210 may include at least one of a silane compound and a nitrogen compound. The silane compound may have an olefin group, an epoxy group, an amino group, or a mercapto group.

According to an embodiment of the present invention, the copper foil 100 has a first surface S1 in a direction of the matte surface MS based on the copper layer 110 and a second surface S2 in a direction of the shiny surface SS. Each of the first surface S1 and the second surface S2 of the copper foil 100 is a surface of the copper foil 100. Further, referring to FIG. 1, the first surface Si of the copper foil 100 is a surface of the protective layer 210. That is, according to an embodiment of the present invention, the first surface S1 of the surfaces S1 and S2 of the copper foil 100 is the same as the surface of the protective layer 210.

In describing the embodiment disclosed in FIG. 1, the first surface S1, which is one of the surfaces S1 and S2 of the copper foil 100, is referred to as the surface of the protective layer 210, and both the surface of the copper foil 100 and the surface of the protective layer 210 are indicated as "S1."

According to an embodiment of the present invention, each of the first surface Si and the second surface S2, which is a surface of the copper foil 100, has a maximum height roughness ($R_{max}$) of 0.6 μm to 3.5 μm, a peak density (PD) of 5 to 110, and an oxygen atomic amount of 22 at % (atomic %) to 67 at %.

More particularly, the surface of the protective layer 210 has a maximum height roughness ($R_{max}$) of 0.6 μm to 3.5 μm.

The maximum height roughness ($R_{max}$) may be measured using a surface roughness tester according to the Japanese Industrial Standards (JIS) B 0601-2001 standards. Specifically, according to an embodiment of the present invention, the maximum height roughness ($R_{max}$) may be measured by a Mitutoyo SJ-310 model. In this case, a measurement length excluding a cut-off length may be set to 4 mm and the cut-off length may be set to 0.8 mm at the beginning and at the end. Further, a radius of a stylus tip may be set to 2 μm, and a measurement pressure may be set to 0.75 mN. When the measurement is performed after the setting as described above, a value of the maximum height roughness ($R_{max}$) may be analyzed, which corresponds to the maximum height roughness ($R_{max}$) based on a measurement value by a Mitutoyo surface roughness tester.

In the case in which the maximum height roughness ($R_{max}$) of the surface of the protective layer 210 is less than 0.6 μm, a contact area between the copper foil 100 and an active material is small when the copper foil 100 is used as a current collector of a secondary battery electrode, and thus a sufficient adhesive force may not be ensured between the copper foil 100 and the active material. Accordingly, the active material may be separated while the secondary battery is charged and discharged.

On the other hand, in the case in which the maximum height roughness ($R_{max}$) of the surface of the protective layer 210 is more than 3.5 μm, the surface of the protective layer 210 is not uniform, and thus the copper foil is not uniformly coated with the active material when the copper foil 100 is used as the current collector of the secondary battery electrode. Accordingly, the adhesive force between the copper foil 100 and the active material may be lowered.

According to an embodiment of the present invention, the surface of the protective layer 210 has a peak density (PD) of 5 to 110.

Figure 2:
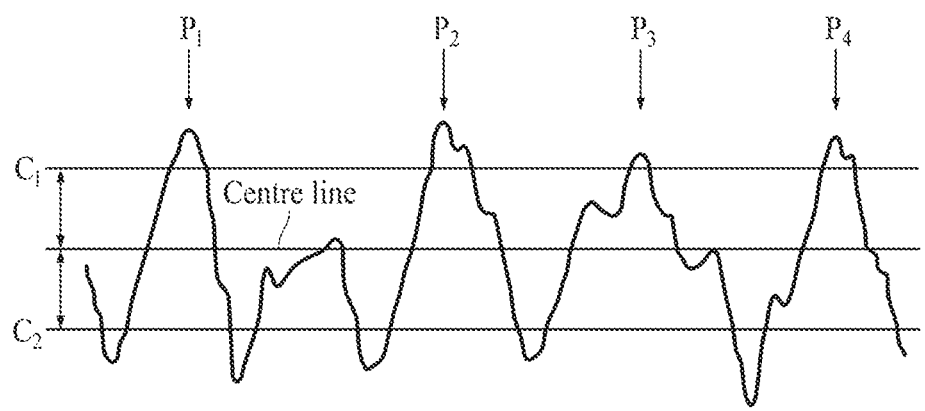
FIG. 2 is a surface roughness profile obtained according to the American Society of Mechanical Engineers (ASME) B46.1 standards.

Hereinafter, the peak density (PD) will be described with reference to FIG. 2. FIG. 2 corresponds to a peak density defined according to the American Society of Mechanical Engineers (ASME) B46.1 standards. The peak density may be measured by a Mahr's surface roughness tester according to the definition of the above standards. For example, the peak density may be measured using a Mahr's Marsurf M300 model. In this case, a measurement length excluding a cut-off length may be set to 4 mm, and the cut-off length may be set to 0.8 mm at the beginning and at the end. Further, a radius of a stylus tip may be set to 2 μm, and a measurement pressure may be set to 0.75 mN. When the measurement is performed after the setting as described above, a value of the peak density may be analyzed, which corresponds to a peak density (Rpc) based on a measurement value by the Mahr's surface roughness tester. When the measurement is performed, a peak count level may be ±0.5 μm based on a center line of a profile. Further, the measurement value represents the number of effective peaks per unit centimeter.

Specifically, according to an embodiment of the present invention, the peak density (PD) may be obtained by measuring peak densities (PD) of any three points of the surface of the copper foil 100 and calculating an average value of the measured values. The peak density (PD) at each of the points is measured by setting a measurement length to 4 mm in a surface roughness profile obtained according to the ASME B46.1 standards. The peak density (PD) is the number of effective peaks $P_1$, $P_2$, $P_3$, and $P_4$ rising above an upper criteria line $C_1$ of 0.5 μm. In this case, at least one valley deeper than a lower criteria line $C_2$ of −0.5 μm is present between adjacent effective peaks of the effective peaks.

When there is no valley deeper than the lower criteria line $C_2$ of −0.5 μm between adjacent peaks rising above the upper criteria line $C_1$, all of these peaks may not be the effective peaks used for measurement of the peak density (PD), and a relatively low peak among the peaks is ignored in obtaining the number of effective peaks.

In the case in which the peak density (PD) of the surface of the protective layer 210 is less than 5, when the copper foil 100 is used as a current collector of a secondary battery electrode, an active specific surface area of the copper foil 100, which may be in contact with the active material, is too small and thus a sufficient adhesive force may not be ensured between the copper foil 100 and the active material. On the other hand, in the case in which the peak density (PD) is more than 110, coating uniformity of the active material is lowered due to too many surface uneven portions, and thus the adhesive force between the copper foil 100 and the active material is significantly lowered.

Further, the surface of the protective layer 210 has an oxygen atomic amount of 22 at % to 67 at %.

The oxygen atomic amount may be measured by Auger electron spectroscopy (AES).

More particularly, the copper foil 100 is cut to prepare a measurement sample of 2 cm×2 cm, and the number of atoms is measured from a surface of the sample using PHI700 (ULVAC-PHI, INC.), which is a device for AES. Analysis conditions are as follows.

Electron energy analyzer: Cylindrical mirror analyzer (CMA)
Electron beam energy: 5 KeV
Target current: 10 nA
Tilt: 30 degrees
Argon etching rate: 60 Å/min based on $SiO_2$ (3 KV argon ion beam)

Figure 3A:
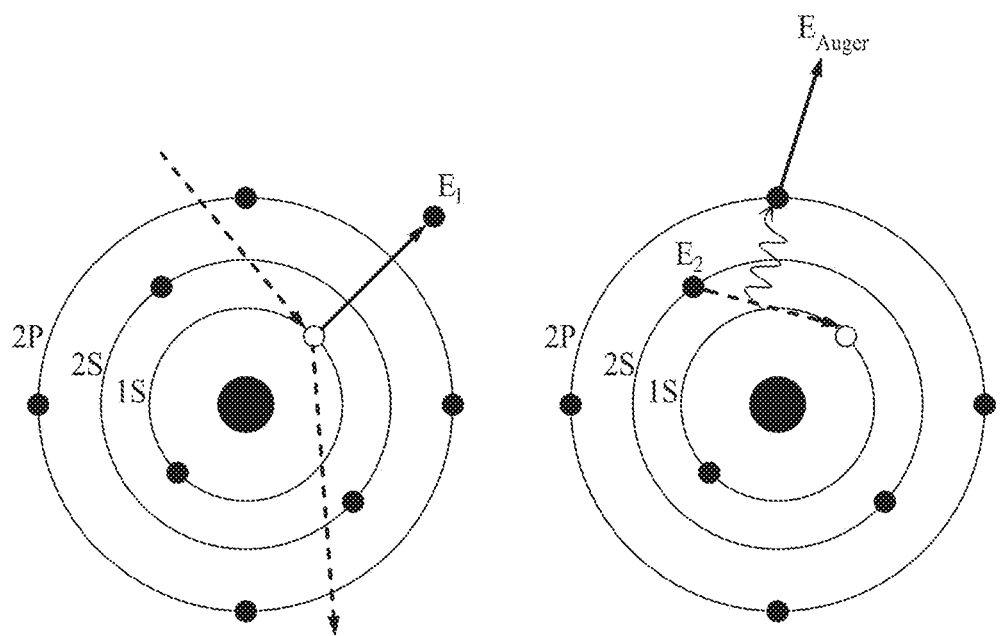
FIG. 3A is a schematic view for describing generation of Auger electrons.

FIG. 3A is a schematic view for describing generation of Auger electrons.

The Auger effect is a physical phenomenon in which another electron is emitted due to an electron emitted from an atom or an ion. A second emission electron generated at this time is called as an Auger electron.

When one electron $E_1$ is removed from an inner level 1s of an atom and remains vacant, one electron $E_2$ of a high level 2s fills the vacancy so that energy is generated as much as a difference in level between the high level 2s and the vacancy. The energy generated in the manner is emitted in the form of a photon or is used for further emitting a second electron.

A phenomenon in which the emitted energy is used for the second emission and the second electron is emitted out of the atom is called as the Auger effect, and the electron emitted at this time is called as an Auger electron ($E_{Auger}$).

According to an embodiment of the present invention, an argon (Ar) ion beam is applied to a sample according to the AES to detect an atomic amount by analyzing an Auger electron emitted as the sample is etched.

Figure 3B:
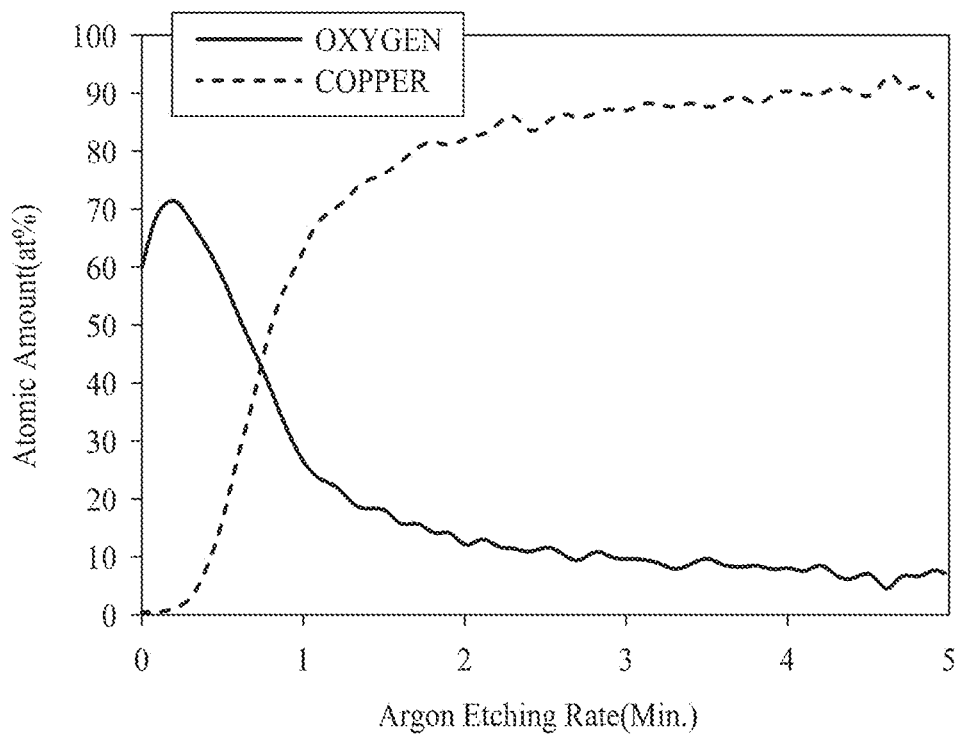
FIG. 3B is a graph of an atomic amount measured by Auger electron spectroscopy.

FIG. 3B is a graph of an atomic amount measured by AES.

Specifically, FIG. 3B shows an atomic amount of copper and oxygen according to an etching rate of a sample by an argon (Ar) ion beam (argon etching rate). In FIG. 3B, an oxygen atomic amount at a point at which an etching rate is zero is an oxygen atomic amount at the surface of the copper foil 100, that is, at the surface of the protective layer 210. Referring to FIG. 3B, an oxygen atomic amount of a surface of the sample is 60 at %.

Oxygen on the surface of the protective layer 210 may contribute to a chemical bonding force between the copper foil 100 and the active material when the copper foil 100 is used as a current collector of a secondary battery electrode. For example, oxygen having a high electronegativity exhibits its affinity with elements contained in the active material so that a chemical bonding force between the copper foil 100 and the active material may be increased.

When the oxygen atomic amount of the surface of the protective layer 210 is less than 22 at %, an effect of increasing the adhesive force between the copper foil 100 and the active material by oxygen is insignificant. On the other hand, when the oxygen atomic amount of the surface of the protective layer 210 is more than 67 at %, the surface of the protective layer 210 may be excessively oxidized and the adhesive force between the copper foil 100 and the active material may be reduced.

According to an embodiment of the present invention, the copper foil 100 may have a yield strength of 25 kgf/mm² or more at a room temperature of 25±15° C. The yield strength is measured using a universal testing machine (UTM). A width of a sample for yield strength measurement is 12.7 mm, a distance between grips is 50 mm, and a measurement speed is 50 mm/min.

When the yield strength of the copper foil 100 is less than 25 kgf/mm², tearing may occur in a manufacturing process of the copper foil 100, and wrinkles or tearing may occur in a manufacturing process of a secondary battery electrode or a secondary battery using the copper foil 100.

Meanwhile, when the yield strength of the copper foil 100 is more than 65 kgf/mm², workability in the manufacturing process of the secondary battery electrode or the secondary battery using the copper foil 100 may be lowered. Therefore, the yield strength of the copper foil 100 may be adjusted to 65 kgf/mm² or less.

The copper foil 100 may have an elongation of 2% or more at a room temperature of 25±15° C. The elongation may be measured by UTM according to a method specified in IPC-TM-650 test method manual. In this case, a width of a sample for elongation measurement is 12.7 mm, a distance between grips is 50 mm, and a measurement speed is 50 mm/min When the elongation of the copper foil 100 is less than 2%, a risk of tearing the copper foil 100 without being stretched due to a force applied in the manufacturing process of the secondary battery electrode or the secondary battery using the copper foil 100 may occur.

Further, the copper foil 100 has a yield strength ratio of 0.55 or more.

According to an embodiment of the present invention, the yield strength ratio may be obtained by the following Equation 1.

$$\text{Yield strength ratio}(kgf/mm^2) = \text{Yield strength}(kgf/mm^2) \times \text{Elongation value} \quad \text{[Equation 1]}$$

In Equation 1, the elongation value is a value without units.

Generally, an elongation is expressed in units of %, but a unit of an elongation value according to an embodiment of the present invention is a numerical value. The elongation is obtained by multiplying the elongation value by 100 and being expressed as %. For example, an elongation of 2% is converted into an elongation value of 0.02. Therefore, after the yield strength and the elongation are measured using universal testing machine (UTM), the yield strength ratio may be calculated using Equation 1.

According to an embodiment of the present invention, the yield strength ratio may evaluate a correlation between a force applied to the copper foil 100 and a deformation of the copper foil 100.

When the yield strength ratio of the copper foil 100 is less than 0.55 kgf/mm$^2$, the copper foil 100 may be deformed due to a force applied in the manufacturing process of the copper foil 100 and in the manufacturing process of the secondary battery electrode or the secondary battery using the copper foil 100 to cause wrinkles in the copper foil 100. In order to prevent the wrinkles, the copper foil 100 may have a yield strength ratio of 0.55 kgf/mm$^2$ or more.

The yield strength ratio of the copper foil 100 may be measured, for example, after heat of 50° C. is applied to the copper foil 100 for 3 minutes and heat of 80° C. is again applied for 6 hours. The condition of applying the heat of 50° C. for 3 minutes corresponds to a thermal history in the manufacturing process of the secondary battery electrode using the copper foil 100, and the condition of applying the heat of 80° C. for 6 hours corresponds to a thermal history in the manufacturing process of the secondary battery using the copper foil 100.

Further, the copper foil 100 may have a thickness of 4 μm to 30 μm. When the thickness of the copper foil 100 is less than 4 μm, workability in the manufacturing process of the secondary battery electrode or the secondary battery using the copper foil 100 is lowered. When the thickness of the copper foil 100 is more than 30 μm, a thickness of the secondary battery electrode using the copper foil 100 may be increased, and it may be difficult to realize a high capacity of the secondary battery due to such a large thickness.

Figure 4:
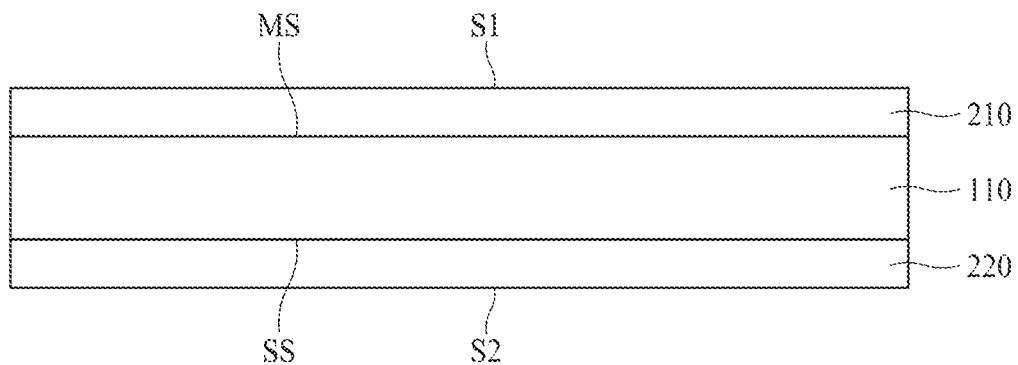
FIG. 4 is a schematic cross-sectional view of a copper foil according to another embodiment of the present invention.

FIG. 4 is a schematic cross-sectional view of a copper foil 200 according to another embodiment of the present invention. Hereinafter, in order to avoid redundancy, descriptions of the components already described will be omitted.

Referring to FIG. 4, the copper foil 200 according to another embodiment of the present invention includes a copper layer 110 and two protective layers 210 and 220 respectively disposed on both surfaces MS and SS of the copper layer 110. The copper foil 200 illustrated in FIG. 4 further includes the protective layer 220 disposed on a shiny surface SS of the copper layer 110 in comparison to the copper foil 100 illustrated in FIG. 1.

Hereinafter, for convenience of description, the protective layer 210 disposed on a matte surface MS of the copper layer 110 among the two protective layers 210 and 220 is referred to as a first protective layer, and the protective layer 220 disposed on the shiny surface SS is referred to as a second protective layer.

The copper foil 200 illustrated in FIG. 4 has a first surface S1, which is a surface in a direction of the matte surface MS based on the copper layer 110, and a second surface S2, which is a surface in a direction of the shiny surface SS. The second surface S2 among the surfaces S1 and S2 of the copper foil 100 is the same as a surface of the second protective layer 220.

The surface of the second protective layer 220 has a maximum height roughness ($R_{max}$) of 0.6 μm to 3.5 μm, a peak density (PD) of 5 to 110, and an oxygen atomic amount of 22 at % to 67 at %.

Further, the second protective layer 220 may include at least one of chromium, a silane compound, and a nitrogen compound.

The copper foil 200 illustrated in FIG. 4 has a yield strength of 25 kgf/mm$^2$ or more and an elongation of 2% or more at a room temperature of 25±15° C. Further, the copper foil 200 has a yield strength ratio of 0.55 kgf/mm$^2$ or more.

The copper foil 200 illustrated in FIG. 4 has a thickness of 4 μm to 30 μm.

Figure 5:
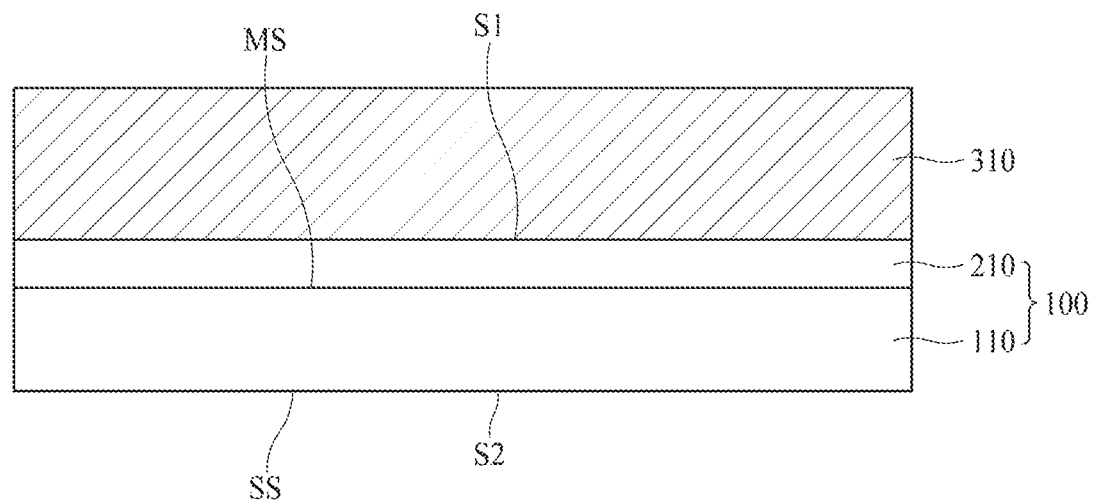
FIG. 5 is a schematic cross-sectional view of a secondary battery electrode according to still another embodiment of the present invention.

FIG. 5 is a schematic cross-sectional view of a secondary battery electrode 300 according to still another embodiment of the present invention.

Figure 7:
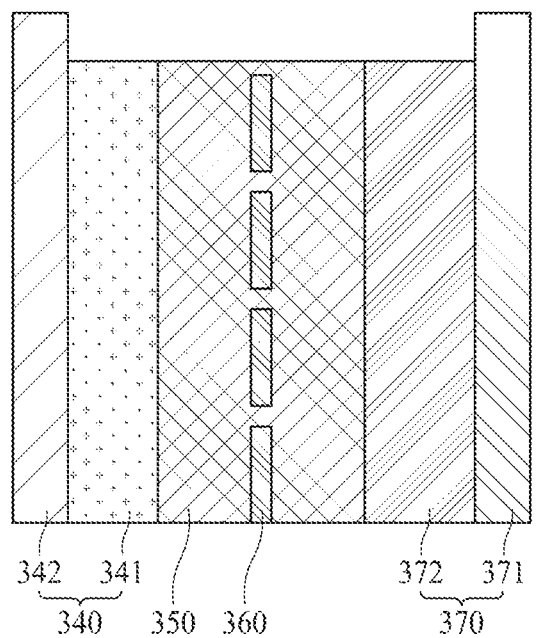
FIG. 7 is a schematic cross-sectional view of a secondary battery according to yet another embodiment of the present invention.

The secondary battery electrode 300 illustrated in FIG. 5 may be applied, for example, to a secondary battery 500 which will be illustrated in FIG. 7.

Referring to FIG. 5, the secondary battery electrode 300 according to still another embodiment of the present invention includes a copper foil 100 and an active material layer 310 disposed on the copper foil 100. Further, the copper foil 100 has a copper layer 110 and a protective layer 210 disposed between the copper layer 110 and the active material layer 310. Here, the copper foil 100 is used as a current collector.

More particularly, the secondary battery electrode 300 according to still another embodiment of the present invention includes the copper foil 100 having a first surface S1 and a second surface S2, and the active material layer 310 which is disposed on at least one of the first surface S1 and the second surface S2 of the copper foil 100. Each of the first surface S1 and the second surface S2 of the copper foil 100 is a surface of the copper foil 100.

In FIG. 5, the copper foil 100 of FIG. 1 is illustrated as being used as a current collector. However, still another embodiment of the present invention is not limited thereto, and the copper foil 200 illustrated in FIG. 4 may be used as a current collector of the secondary battery electrode 300.

Further, a structure in which the active material layer 310 is disposed only on the first surface S1 of the surfaces S1 and S2 of the copper foil 100 is illustrated in FIG. 5, but still another embodiment of the present invention is not limited thereto, and the active material layer 310 may be disposed on both the first surface S1 and the second surface S2 of the copper foil 100. Further, the active material layer 310 may be disposed only on the second surface S2 of the copper foil 100.

The active material layer 310 illustrated in FIG. 5 may be made of an electrode active material, and, specifically, may be made of an anode active material. That is, the secondary battery electrode 300 illustrated in FIG. 5 may be used as an anode.

The active material layer 310 may include at least one of carbon, a metal, a metal oxide, and a composite of a metal and carbon. At least one of Ge, Sn, Li, Zn, Mg, Cd, Ce, Ni, and Fe may be used as the metal. Further, in order to increase a charge and discharge capacity of a secondary battery, the active material layer 310 may include silicon (Si).

As the secondary battery is repeatedly charged and discharged, the active material layer 310 alternately shrinks and expands, causing separation between the active material layer 310 and the copper foil 100, and thus charge and discharge efficiency of the secondary battery is lowered. Therefore, in order to suppress the charge and discharge efficiency reduction of the secondary battery, an adhesive force or an adhesive strength between the copper foil 100 and the active material layer 310 should be excellent.

It is generally known that the adhesive force or the adhesive strength between the copper foil 100 and the active material layer 310 may be improved by controlling a surface roughness ($R_z$) of the copper foil 100. Actually, however, even when the surface roughness ($R_z$) is appropriately adjusted, the copper foil 100 does not necessarily satisfy the adhesive force between the copper foil 100 and the active material layer 310 required for the secondary battery. Specifically, when the active material layer 310 includes Si to increase a capacity of the secondary battery, a relationship between the surface roughness ($R_z$) of the copper foil 100 and a capacity retention rate of the secondary battery may be lowered.

According to the embodiments of the present invention, it can be confirmed that in ensuring the adhesive force between the copper foil 100 and the active material layer 310, a chemical property such as an oxygen atomic amount of a surface of a copper foil in addition to a physical property such as a surface roughness ($R_z$) of the copper foil 100 is an important factor.

Referring to FIG. 5, the copper layer 110 has a matte surface MS and a shiny surface SS opposite the matte surface MS. In FIG. 5, a structure in which the protective layer 210 is disposed on the matte surface MS is illustrated, but still another embodiment of the present invention is not limited thereto, and the protective layer 210 may be disposed only on the shiny surface SS, or may be disposed on both the matte surface MS and the shiny surface SS.

The protective layer 210 includes, for example, chromium (Cr). The protective layer 210 may be made by an antirust solution containing chromium (Cr), for example, an antirust solution containing a chromate compound.

Further, the protective layer 210 may include at least one of a silane compound and a nitrogen compound.

According to still another embodiment of the present invention, each of the first surface S1 and the second surface S2 of the copper foil 100 has a maximum height roughness ($R_{max}$) of 0.6 μm to 3.5 μm, a peak density (PD) of 5 to 110, and an oxygen atomic amount of 22 at % to 67 at %.

More particularly, the surface of the copper foil 100 in contact with the active material layer 310, that is, the first surface S1, has a maximum height roughness ($R_{max}$) of 0.6 μm to 3.5 μm. The maximum height roughness ($R_{max}$) is measured by a surface roughness tester (e.g., Mitutoyo SJ-310 model) according to JIS B 0601-2001 standards. In FIG. 5, the maximum height roughness ($R_{max}$) of the surface of the copper foil 100 is the same as a maximum height roughness ($R_{max}$) of a surface of the protective layer 210.

When the maximum height roughness ($R_{max}$) of the surface of the copper foil 100 is less than 0.6 μm, a contact area between the copper foil 100 and the active material layer 310 is small and thus a sufficient adhesive force may not be ensured between the copper foil 100 and the active material layer 310. Accordingly, the active material layer 310 may be separated while the secondary battery is charged and discharged.

On the other hand, when the maximum height roughness ($R_{max}$) of the surface of the copper foil 100 is more than 3.5 μm, the surfaces S1 and S2 of the copper foil 100 is not uniform, and thus the copper foil 100 is not uniformly coated with an active material. Accordingly, the adhesive force between the copper foil 100 and the active material layer 310 may be lowered.

The surface of the copper foil 100 has a peak density (PD) of 5 to 110.

When the peak density (PD) of the surface of the copper foil 100 is less than 5, an active specific surface area of the copper foil 100 which may be in contact with the active material layer 310 is too small and a sufficient adhesive force may not be ensured between the copper foil 100 and the active material layer 310. On the other hand, when the peak density (PD) is more than 110, coating uniformity of the active material is lowered due to too many surface uneven portions, and thus the adhesive force between the copper foil 100 and the active material 310 is significantly lowered.

Further, the surface of the copper foil 100 has an oxygen atomic amount of 22 at % to 67 at %.

Oxygen on the surface of the copper foil 100 may contribute to a chemical bonding force between the copper foil 100 and the active material layer 310. When the oxygen atomic amount of the surface of the copper foil 100 is less than 22 at %, an effect of increasing the adhesive force between the copper foil 100 and the active material layer 310 by oxygen is insignificant. On the other hand, when the oxygen atomic amount of the surface of the copper foil 100 is more than 67 at %, the surface of the copper foil 100 may be excessively oxidized and the adhesive force between the copper foil 100 and the active material layer 310 may be reduced.

The copper foil 100 may have a yield strength of 25 kgf/mm² or more at a room temperature of 25±15° C. More particularly, the copper foil 100 may have a yield strength of 25 kgf/mm² to 65 kgf/mm² at a room temperature of 25±15° C.

The copper foil 100 may have an elongation of 2% or more at a room temperature of 25±15° C.

Further, the copper foil 100 has a yield strength ratio of 0.55 kgf/mm² or more. The yield strength ratio may be obtained by Equation 1.

When the yield strength ratio of the copper foil 100 is less than 0.55 kgf/mm², the copper foil 100 may be deformed due to a force applied in the manufacturing process of the secondary battery electrode 300 or a secondary battery (see FIG. 7) to cause wrinkles in the copper foil 100.

The yield strength ratio of the copper foil 100 may be measured, for example, after heat of 50° C. is applied to the copper foil 100 for 3 minutes and heat of 80° C. is again applied for 6 hours. The condition of applying the heat of 50° C. for 3 minutes corresponds to a thermal history in the manufacturing process of the secondary battery electrode 300 using the copper foil 100, and the condition of applying the heat of 80° C. for 6 hours corresponds to a thermal history in the manufacturing process of the secondary battery (see FIG. 7) using the copper foil 100.

Further, the copper foil 100 may have a thickness of 4 μm to 30 μm. When the thickness of the copper foil 100 is less than 4 μm, workability in the manufacturing process of the secondary battery electrode 300 or the secondary battery (see FIG. 7) is lowered. When the thickness of the copper foil 100 is more than 30 μm, a thickness of the secondary battery electrode 300 using the copper foil 100 is increased, and it is difficult to realize a high capacity of the secondary battery due to such a large thickness.

Figure 6:
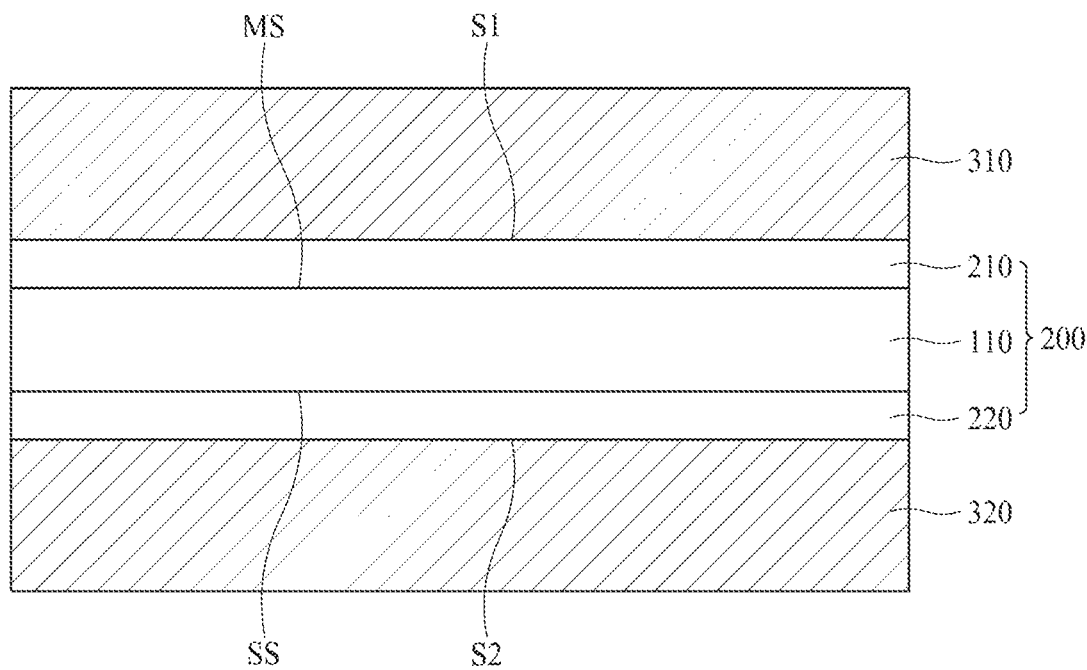
FIG. 6 is a schematic cross-sectional view of a secondary battery electrode according to yet another embodiment of the present invention.

FIG. 6 is a schematic cross-sectional view of a secondary battery electrode 400 according to yet another embodiment of the present invention.

The secondary battery electrode 400 according to yet another embodiment of the present invention includes a copper foil 200 and active material layers 310 and 320 disposed on the copper foil 200. The copper foil 200 includes a copper layer 110 and protective layers 210 and 220 which are respectively disposed between the copper layer 110 and the active material layers 310 and 320.

More particularly, the secondary battery electrode 400 illustrated in FIG. 6 includes the copper foil 200 having a first surface S1 and a second surface S2, and the two active material layers 310 and 320 respectively disposed on the first surface S1 and the second surface S2 of the copper foil 200. Here, the active material layer 310 disposed on the first surface S1 of the copper foil 200 is referred to as a first active material layer 310, and the active material layer 320 disposed on the second surface S2 of the copper foil 200 is referred to as a second active material layer 320.

The second active material layer 320 may include at least one of carbon, a metal, a metal oxide, and a composite of a metal and carbon. At least one of Ge, Sn, Li, Zn, Mg, Cd, Ce, Ni, and Fe may be used as the metal. Further, in order to increase a charge and discharge capacity of the secondary battery, the second active material layer 320 may include silicon (Si).

Further, referring to FIG. 6, the protective layers 210 and 220 are respectively disposed on a matte surface MS and a shiny surface SS of the copper layer 110.

Referring to FIG. 6, the copper foil 200 has a first surface S1 in a direction of the matte surface MS based on the copper layer 110 and a second surface S2 in a direction of the shiny surface SS. Each of the first surface S1 and the second surface S2 of the copper foil 200 is a surface of the copper foil 200.

According to yet another embodiment of the present invention, each of the first surface S1 and the second surface S2 which are both surfaces of the copper foil 200 has a maximum height roughness ($R_{max}$) of 0.6 μm to 3.5 μm, a peak density (PD) of 5 to 110, and an oxygen atomic amount of 22 at % to 67 at %.

More particularly, each of the first surface S1 and the second surface S2 of the copper foil 200 has a maximum height roughness ($R_{max}$) of 0.6 μm to 3.5 μm.

When the maximum height roughness ($R_{max}$) of each of the first surface S1 and the second surface S2 of the copper foil 200 is less than 0.6 μm, a contact area between the copper foil 200 and the active material layers 310 and 320 is small and thus a sufficient adhesive force may not be ensured between the copper foil 200 and the active material layers 310 and 320. Accordingly, the active material layers 310 and 320 may be separated while the secondary battery is charged and discharged.

Each of the first surface S1 and the second surface S2 of the copper foil 200 has a peak density (PD) of 5 to 110.

When the peak density (PD) of each of the first surface S1 and the second surface S2 of the copper foil 200 is less than 5, an active specific surface area of the copper foil 200 which may be in contact with the active material layers 310 and 320 is too small and a sufficient adhesive force may not be ensured between the copper foil 200 and the active material layers 310 and 320. On the other hand, when the peak density (PD) is more than 110, coating uniformity of the active material is lowered due to too many surface uneven portions, and thus the adhesive force between the copper foil 200 and the active material layers 310 and 320 is significantly lowered.

Further, each of the first surface S1 and the second surface S2 of the copper foil 200 has an oxygen atomic amount of 22 at % to 67 at %.

When the oxygen atomic amount of each of the first surface S1 and the second surface S2 of the copper foil 200 is less than 22 at %, an effect of increasing the adhesive force between the copper foil 200 and the active material layers 310 and 320 by oxygen is insignificant. On the other hand, when the oxygen atomic amount of each of the first surface S1 and the second surface S2 of the copper foil 200 is more than 67 at %, the first surface S1 and the second surface S2 of the copper foil 200 may be excessively oxidized and the adhesive force between the copper foil 200 and the active material layers 310 and 320 may be reduced.

The copper foil 200 may have a yield strength of 25 kgf/mm² or more at a room temperature of 25±15° C. More particularly, the copper foil 200 may have a yield strength of 25 kgf/mm² to 65 kgf/mm² at a room temperature of 25±15° C.

The copper foil 200 may have an elongation of 2% or more at a room temperature of 25±15° C.

Further, the copper foil 200 has a yield strength ratio of 0.55 kgf/mm² or more. The yield strength ratio may be obtained by Equation 1.

When the yield strength ratio of the copper foil 200 is less than 0.55 kgf/mm², the copper foil 200 may be easily deformed due to a force applied in the manufacturing process of the secondary battery electrode 400 or the secondary battery (see FIG. 7) to cause wrinkles in the copper foil 200.

Further, the copper foil 200 may have a thickness of 4 μm to 30 μm. When the thickness of the copper foil 200 is less than 4 μm, workability in the manufacturing process of the secondary battery electrode 400 or the secondary battery (see FIG. 7) is lowered. When the thickness of the copper foil 200 is more than 30 μm, a thickness of the secondary battery electrode 400 using the copper foil 200 is increased, and it is difficult to realize a high capacity of the secondary battery due to such a large thickness.

FIG. 7 is a schematic cross-sectional view of a secondary battery 500 according to yet another embodiment of the present invention. The secondary battery 500 illustrated in FIG. 7 is, for example, a lithium secondary battery.

Referring to FIG. 7, the secondary battery 500 includes a cathode 370 and an anode 340 facing each other, an electrolyte 350 which provides an environment in which ions may move between the cathode 370 and the anode 340, and a separator 360 which electrically insulates the cathode 370 and the anode 340 from each other. Here, the ions which move between the cathode 370 and the anode 340 are lithium ions. The separator 360 separates the cathode 370 and the anode 340 from each other in order to prevent a charge generated in one electrode from being consumed inefficiently by moving to another electrode through an inside of the secondary battery 500. Referring to FIG. 7, the separator 360 is disposed inside the electrolyte 350.

The cathode 370 includes a cathode collector 371 and a cathode active material layer 372. An aluminum foil may be used as the cathode collector 371 to be coupled to the cathode active material layer 372.

The anode 340 includes an anode collector 342 and an active material layer 341. The active material layer 341 of the anode 340 includes an anode active material.

The copper foils 100 and 200 disclosed in FIGS. 1 and 4 may be used as the anode collector 342. Further, the secondary battery electrodes 300 and 400 illustrated in FIGS. 5 and 6 may be used as the anode 340 of the secondary battery 500 illustrated in FIG. 7.

Hereinafter, a method of manufacturing the copper foil 200 according to another embodiment of the present invention will be described in detail with reference to FIG. 8.

Figure 8:
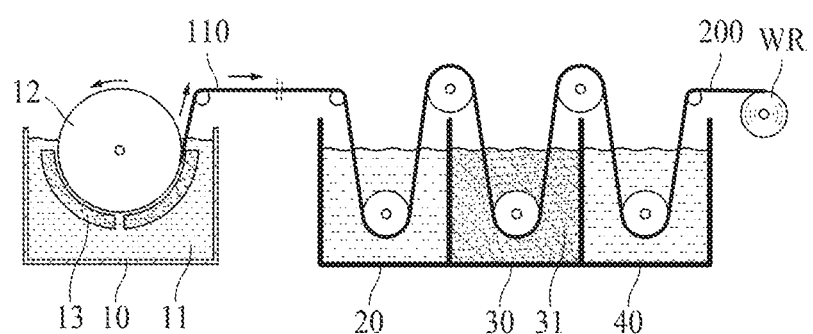
FIG. 8 is a schematic view of a process of manufacturing the copper foil illustrated in FIG. 4.

FIG. 8 is a schematic view of a method of manufacturing the copper foil 200 illustrated in FIG. 4.

First, a copper layer 110 is formed with a current having a density of 40 to 80 ASD (A/dm²) which runs from a positive electrode plate 13 to a rotating negative electrode drum 12 spaced apart from each other in an electrolytic solution 11 containing copper ions.

The electrolytic solution 11 includes 70 to 90 g/L of copper ions and 80 to 120 g/L of sulfuric acid. Further, the electrolytic solution 11 may include an organic additive of 1 to 10 ppm. For example, at least one selected from among hydroxyethyl cellulose (HEC), organic sulfide, organic nitride, and thiourea may be used as the organic additive.

For example, when a current having a density of 40 to 80 ASD (A/dm$^2$) runs from the positive electrode plate 13 to the rotating negative electrode drum 12 spaced apart from each other in the electrolytic solution 11 contained in an electrolytic tank 10, copper is electrodeposited on the rotating negative electrode drum 12 to form the copper layer 110. A distance between the positive electrode plate 13 and the rotating negative electrode drum 12 may range from 8 to 13 mm.

As a density of a current applied between the positive electrode plate 13 and the rotating negative electrode drum 12 is increased, plating is uniformly performed. Therefore, a surface roughness of a matte surface MS of the copper layer 110 is reduced, and thus a maximum height roughness ($R_{max}$) of a surface of a copper foil 200, for example, a first surface S1, is reduced.

When the density of the current applied between the positive electrode plate 13 and the rotating negative electrode drum 12 is less than 40 ASD, the surface roughness of the copper layer 110 is increased due to generation of crystal grains, and thus the maximum height roughness ($R_{max}$) of the surface of the copper foil 200, for example, the first surface S1, is more than 3.5 μm.

On the other hand, when the density of the current applied between the positive electrode plate 13 and the rotating negative electrode drum 12 is more than 80 ASD, grain refinement is accelerated and the surface roughness of the copper layer 110 is reduced so that the maximum height roughness ($R_{max}$) of the surface of the copper foil 200, for example, the first surface S1, is less than 0.6 μm. In this case, an elongation of the copper foil 200 is reduced to less than 2% due to the grain refinement in the copper layer 110.

In the forming process of the copper layer 110, the electrolytic solution 11 may be maintained at 40 to 60° C., and a flow rate of the electrolytic solution 11 supplied to the electrolytic tank 10 may be 30 to 50 m$^3$/hour. A deviation of the flow rate of the electrolytic solution 11 supplied to the electrolytic tank 10 may be adjusted within 2%.

The surface roughness of the matte surface MS of the copper layer 110 may be controlled by adjusting a condition for forming the copper layer 110, such as the current density or a composition of the electrolytic solution 11.

A surface roughness of a shiny surface SS of the copper layer 110 may vary according to a degree of polishing of a surface of the rotating negative electrode drum 12. In order to adjust the surface roughness of the shiny surface SS, the surface of the rotating negative electrode drum 12 may be polished with an abrasive brush, for example, having a particle-size (grit) of #800 to #1500.

Total inorganic carbon (TIC) in the electrolytic solution 11 is 0.05 g/L or less. When the total inorganic carbon (TIC) in the electrolytic solution 11 is maintained at 0.05 g/L or less, the maximum height roughness ($R_{max}$) of the surfaces S1 and S2 of the copper foil 200 may be maintained at 0.6 μm to 3.5 μm, and the peak density (PD) may be maintained at 5 to 110.

More particularly, when the total inorganic carbon (TIC) in the electrolytic solution 11 is more than 0.05 g/L, inorganic carbide promotes uniformization of copper plating on the surface of the copper layer 110, so that the surface roughness of the copper layer 110 is reduced. Accordingly, the peak density (PD) of the surface of the copper foil 200 is reduced to less than 5.

In order to maintain the total inorganic carbon (TIC) in the electrolytic solution 11 at 0.05 g/L or less, heat treatment may be performed on a copper wire as a material of a copper ion, the heat-treated copper wire may be pickled, and then the pickled copper wire may be introduced into sulfuric acid for an electrolytic solution.

More particularly, heat treatment may be performed on the copper wire at a temperature of 600 to 900° C. for 30 to 60 minutes under an oxygen atmosphere to remove organic matter remaining on the copper wire, the heat-treated copper wire may be pickled with a 10% sulfuric acid solution, the pickled copper wire may be introduced into sulfuric acid for an electrolytic solution, and thus the electrolytic solution 11 having no or little impurities may be prepared.

Further, in order to remove carbon remaining in the electrolytic solution 11 during electroplating, the electrolytic solution 11 may be filtered using activated carbon. The electrolytic solution 11 may be continuously filtered or circulated and filtered at a flow rate of 30 to 45 m$^3$/hr.

Further, the total inorganic carbon (TIC) in the electrolytic solution 11 may be lowered by decomposing organic matter in the electrolytic solution 11 by ozone treatment of the electrolytic solution 11.

Further, a concentration of iron (Fe) ions in the electrolytic solution 11 is maintained at 0.30 g/L or less. When the concentration of iron (Fe) ions is more than 0.30 g/L, the surface roughness of the copper layer 110 is increased due to generation of crystal grains, and thus the maximum height roughness ($R_{max}$) of the surface of the copper foil 200 is more than 3.5 μm.

In order to reduce the concentration of iron (Fe) ions in the electrolytic solution 11 to 0.30 g/L or less, foreign matters may be subjected to removal and cleaning before the copper wire is introduced into the sulfuric acid for the electrolytic solution 11.

Further, a degree of cleanliness of the electrolytic solution 11 may be maintained or improved by introducing hydrogen peroxide and air into the electrolytic solution 11 while the copper layer 110 is formed by electroplating.

Next, the copper layer 110 is cleaned in a cleaning tank 20.

For example, acid cleaning for removing impurities, such as a resin component, a natural oxide, or the like, on the surface of the copper layer 110 and water cleaning for removing an acidic solution used in acid cleaning may be sequentially performed. A hydrochloric acid solution, a sulfuric acid solution, a sulfuric acid-hydrogen peroxide solution, or a mixture of at least two thereof may be used as the acid solution for an acid cleaning process. A concentration and a temperature of the acid solution may be adjusted according to characteristics of a production line.

The cleaning process may be omitted.

Next, protective layers 210 and 220 are formed on the copper layer 110.

The formation of the protective layers 210 and 220 may include performing chromium (Cr) treatment on the surface of the copper layer 110 using, for example, an antirust solution 31 contained in an antirust tank 30. The protective layers 210 and 220 containing chromium are formed by the chromium treatment.

Referring to FIG. 8, the copper layer 110 is immersed in the antirust solution 31 containing chromium to form the protective layers 210 and 220 on the copper layer 110. In the antirust solution 31, chromium may present in an ionic state.

The antirust solution 31 may contain chromium of 0.5 to 5 g/L, and more particularly, may contain chromium of 1.5 to 3.0 g/L. In order to form the protective layers 210 and 220, a temperature of the antirust solution 31 may be maintained at 20 to 40° C. Such chromium treatment is referred to as anticorrosive treatment, and the protective layers 210 and 220 are referred to as anticorrosive films.

The antirust solution 31 may have a pH of 1.5 to 4.2 and a dissolved oxygen amount of 5 ppm or less. Oxygen atomic amounts of the surfaces S1 and S2 of the copper foil 200 or the surface of the protective layers 210 and 220 may be adjusted by adjusting the pH and the dissolved oxygen amount of the antirust solution 31.

When the pH of the antirust solution 31 is less than 1.5, the number of active sites capable of binding to oxygen on the surface of the copper foil 200 is reduced during the formation of the protective layers 210 and 220 so that the oxygen atomic amounts of the surfaces S1 and S2 of the copper foil 200 are less than 22 at %.

On the other hand, when the pH of the antirust solution 31 is more than 4.2 and the dissolved oxygen amount is more than 5 ppm, the number of active sites capable of binding to oxygen on the surfaces S1 and S2 of the copper foil 200 is increased, and a large amount of oxygen is bound to the surfaces S1 and S2 of the copper foil 200 due to excessive dissolved oxygen in the antirust solution 31. Accordingly, the oxygen atomic amounts of the surfaces S1 and S2 of the copper foil 200 are more than 67 at %.

Meanwhile, the protective layers 210 and 220 may include a silane compound by silane treatment, or may include a nitrogen compound by nitrogen treatment.

The copper foil 200 is formed by forming the protective layers 210 and 220.

Next, the copper foil 200 is cleaned in a cleaning tank 40. The cleaning process may be omitted.

Next, after a drying process is performed, the copper foil 200 is wound on a winder WR.

Hereinafter, the present invention will be described in detail with reference to manufacturing examples and comparative examples. However, manufacturing examples described below are only for the understanding of the present invention, and the scope of the present invention is not limited to these manufacturing examples.

MANUFACTURING EXAMPLES 1 TO 6 AND COMPARATIVE EXAMPLES 1 TO 6

A copper foil was prepared using a foil maker including an electrolytic tank 10, a rotating negative electrode drum 12 disposed in the electrolytic tank 10, and a positive electrode plate 13 spaced a predetermined distance from the rotating negative electrode drum 12. The electrolytic solution 11 was a copper sulfate solution, a concentration of copper ions of the copper sulfate solution was 75 g/L, a concentration of sulfuric acid was 100 g/L, and a temperature of the copper sulfate solution was maintained at 55° C.

Total inorganic carbon (TIC) and a concentration of iron (Fe) ions contained in the copper sulfate solution, which is the electrolytic solution 11, are as shown in Table 1 below.

A copper layer 110 was prepared by applying a current density as shown in Table 1 between the rotating negative electrode drum 12 and the positive electrode plate 13.

Next, the copper layer 110 was cleaned using a cleaning tank 20.

Next, the copper layer 110 was immersed in an antirust solution 31 contained in an antirust tank 30 to form protective layers 210 and 220 containing chromium on a surface of the copper layer 110. As a result, copper foils in Manufacturing Examples 1 to 6 and Comparative Examples 1 to 6 were prepared. In this case, a temperature of the antirust solution 31 was maintained at 30° C.

The antirust solution 31 used in forming the protective layers 210 and 220 contained chromium (Cr) of 2.2 g/L. Chromium may be present in an ionic state. A pH of the antirust solution 31 and a dissolved oxygen amount contained in the antirust solution 31 are shown in Table 1. The pH of the antirust solution may be adjusted by sulfuric acid and a 1 M aqueous sodium hydroxide solution being introduced.

TABLE 1

| Items | Current Density (ASD) | Total Inorganic Carbon (TIC) (g/L) | Iron (Fe) Ions (g/L) | pH (g/L) | Dissolved Oxygen Amount (ppm) |
|---|---|---|---|---|---|
| Manufacturing Example 1 | 78 | 0.02 | 0.12 | 2.9 | 3 |
| Manufacturing Example 2 | 42 | 0.02 | 0.12 | 2.9 | 3 |
| Manufacturing Example 3 | 60 | 0.04 | 0.12 | 2.9 | 3 |
| Manufacturing Example 4 | 60 | 0.02 | 0.29 | 2.9 | 3 |
| Manufacturing Example 5 | 60 | 0.02 | 0.12 | 1.6 | 3 |
| Manufacturing Example 6 | 60 | 0.02 | 0.12 | 4.1 | 5 |
| Comparative Example 1 | 82 | 0.02 | 0.12 | 2.9 | 3 |
| Comparative Example 2 | 38 | 0.02 | 0.12 | 2.9 | 3 |
| Comparative Example 3 | 60 | 0.06 | 0.12 | 2.9 | 3 |
| Comparative Example 4 | 60 | 0.02 | 0.32 | 2.9 | 3 |
| Comparative Example 5 | 60 | 0.02 | 0.12 | 1.3 | 3 |
| Comparative Example 6 | 60 | 0.02 | 0.12 | 4.3 | 7 |

(i) A maximum height roughness ($R_{max}$), (ii) a peak density (PD), (iii) a yield strength ratio, and (iv) an oxygen atomic amount of a surface of each of the copper foils in Manufacturing Examples 1 to 6 and Comparative Examples 1 to 6 manufactured as described above were measured. Results of the measurement are shown in Table 2.

(i) Maximum Height Roughness ($R_{max}$)

The maximum height roughness ($R_{max}$) of a surface of the copper foil was measured using an surface roughness tester (Mitutoyo SJ-310 model) according to JIS B 0601-2001 standards. In this case, a measurement length excluding a cut-off length was set to 4 mm and the cut-off length was set to 0.8 mm at the beginning and at the end. Further, a radius of a stylus tip was set to 2 μm, and a measurement pressure was set to 0.75 mN. A value of the maximum height roughness ($R_{max}$) was obtained based on the measurement value by the Mitutoyo surface roughness tester by performing the measurement after the setting as described above.

(ii) Peak Density (PD)

The peak density (PD) was measured by determining the number of effective peaks rising above an upper criteria line of 0.5 μm per unit of a sampling length of 4 mm in a surface roughness profile obtained according to the ASME B46.1 standards.

(iii) Yield Strength Ratio

The elongation and the yield strength were measured using UTM according to a method specified in IPC-TM-650 test method manual. A width of a sample for measurement of the elongation and the yield strength was 12 7 mm, a distance between grips was 50 mm, and a measurement speed was 50 mm/min.

Heat treatment was performed on the sample at 50° C. for 3 minutes and at 80° C. for 6 hours.

The yield strength ratio was calculated according to Equation 1 using the elongation and the yield strength.

Yield strength ratio(kgf/mm$^2$)=Yield strength(kgf/mm$^2$)×Elongation value　　[Equation 1]

In Equation 1, the elongation value is a value without units.

(iv) Oxygen Atomic Amount of Surface

The copper foil was cut to prepare a measurement sample of 2 cm×2 cm, and the number of atoms was measured from a surface of the sample using PHI700 (ULVAC-PHI, INC.), which is a device for AES. Analysis conditions are as follows.

Electron energy analyzer: Cylindrical mirror analyzer (CMA)

Electron beam energy: 5 KeV

Target current: 10 nA

Tilt: 30 degrees

Argon etching rate: 60 Å/min based on SiO$_2$ (3 KV argon ion beam)

An oxygen atomic amount at a point at which an etching rate is zero is an oxygen atomic amount at the surface of the copper foil when an argon ion beam is applied on the sample to etch the sample.

Next, surfaces of the copper foils prepared in Manufacturing Examples 1 to 6 and Comparative Examples 1 to 6 were coated with a anode active material, and then adhesive forces were evaluated.

(v) Adhesive Force

1) Preparation of Anode 1-1) Anode Active Material Preparation

A mixture of artificial graphite and SiO$_2$ (95%:5%) as a anode active material, styrene-butadiene rubber as a binder, and carboxymethyl cellulose as a thickener were mixed in a weight ratio of 97:1.5:1.5, and the mixture was dispersed in water to prepare a slurry for a anode active material.

1-2) Anode Active Material Coating

The copper foils prepared in Manufacturing Examples 1 to 6 and Comparative Examples 1 to 6 were placed on a glass plate whose surface is clean, and then spread to prevent wrinkling and creasing, and the copper foils were coated with the slurry for a anode active material using a bar coater. A coating amount of the slurry for a anode active material was 9.0±0.5 mg/cm$^2$. In this case, a speed of the bar coater was 10 to 15 mm/s. The copper foils coated with the slurry for a anode active material were placed in a drying oven heated at 100° C. and were dried for 15 minutes.

1-3) Press

A sample of the copper foil dried after the slurry for a anode active material was coated was compressed using a roll press to prepare an electrode. In this case, 4-stage compression was performed so that a density of the electrode was 1.55±0.05 g/cc. An electrode including a anode active material adhered to the copper foil was completed by such compression.

2) Adhesive Force Measurement 2-1) Sample Preparation for Adhesive Force Measurement The electrode to be measured for an adhesive force was cut into a width of 10 mm and a length of 100 mm A portion of the anode active material of the cut electrode and a reinforcing plate were attached with double-sided tape. In this case, all of the prepared samples may be attached with uniform force.

2-2) Adhesive Force Measurement

A peel strength between the copper foil and the anode active material layer was measured using UTM according to IPC-TM-650 standards. A width of the measurement sample was 12.7 mm, and a measurement speed was 50 mm/min In this case, a 90° peel force was measured (90° peeling test). That is, the reinforcing plate and the anode active material layer were attached with double-sided tape, and an adhesive force was measured by measuring a peel strength while peeling the copper foil at 90°.

Measurement results are shown in Table 2.

TABLE 2

| Items | $R_{max}$ (μm) | Peak Density (pieces, ea/cm) | Yield Strength Ratio (kgf/mm$^2$) | Oxygen Content of Surface of Copper Foil (at %) | Adhesive Force (N/m) |
|---|---|---|---|---|---|
| Manufacturing Example 1 | 0.63 | 55 | 0.57 | 45.3 | 29.5 |
| Manufacturing Example 2 | 3.48 | 55 | 2.58 | 45.2 | 28.7 |
| Manufacturing Example 3 | 1.99 | 6 | 1.25 | 45.2 | 28.6 |
| Manufacturing Example 4 | 1.98 | 108 | 1.45 | 45.3 | 27.3 |
| Manufacturing Example 5 | 1.97 | 54 | 1.68 | 23.1 | 29.1 |
| Manufacturing Example 6 | 2.00 | 54 | 1.67 | 66.5 | 27.5 |
| Comparative Example 1 | 0.58 | 55 | 0.53 | 45.4 | 22.8 |
| Comparative Example 2 | 3.55 | 56 | 2.72 | 45.3 | 23.9 |
| Comparative Example 3 | 1.98 | 4 | 1.08 | 45.3 | 23.6 |
| Comparative Example 4 | 1.97 | 112 | 1.24 | 45.1 | 24.2 |
| Comparative Example 5 | 1.98 | 55 | 1.66 | 20.8 | 22.1 |
| Comparative Example 6 | 1.99 | 55 | 1.67 | 67.4 | 23.7 |

Referring to Table 2, it can be seen that secondary battery electrodes prepared using the following copper foils do not have a sufficient adhesive force (adhesive force of 25 N/mm² or less):

(1) Comparative Example 1 in which a current density in the process of forming the copper layer 110 is more than 80 ADS and Comparative Example 2 in which a current density is less than 40 ADS;

(2) Comparative Example 3 in which total inorganic carbon (TIC) in an electrolytic solution is more than 0.05 g/L; (3) Comparative Example 4 in which a concentration of iron (Fe) ions in an electrolytic solution is more than 0.30 g/L;

(4) Comparative Example 5 in which a pH of an antirust solution is less than 1.5 and Comparative Example 6 in which a pH of an antirust solution is more than 4.2;

(5) Comparative Example 6 in which a dissolved oxygen amount of an antirust solution is 5 ppm or more;

(6) Comparative Example 1 in which a maximum height roughness ($R_{max}$) is less than 0.6 μm and Comparative Example 2 in which a maximum height roughness ($R_{max}$) is more than 3.5 μm;

(7) Comparative Example 3 in which a peak density (PD) is less than 5 and Comparative Example 4 in which a peak density (PD) is more than 110;

(8) Comparative Example 1 in which a yield strength ratio is less than 0.55; and (9) Comparative Example 5 in which an oxygen atomic amount of a surface of a copper foil is less than 22 at % and Comparative Example 6 in which an oxygen atomic amount of a surface of a copper foil is more than 67 at %.

On the other hand, it can be confirmed that electrodes in Manufacturing Examples 1 to 6 prepared in a condition range according to the embodiments of the present invention have an improved adhesive force.

While the exemplary embodiments of the present invention and their advantages have been described in detail with reference to the accompanying drawings, it will be apparent to those skilled in the art to which the present invention belongs that various changes, substitutions and alterations may be made herein without departing from the scope of the present invention.

Therefore, the scope of the present invention is defined by the appended claims, and all changes or modifications derived from the meaning, scope, and equivalence of the claims are to be construed as being included in the scope of the present invention.

A copper foil according to an embodiment of the present invention has excellent physical and chemical properties, and thus can have an improved adhesive force with an active material. Further, a secondary battery electrode including the copper foil can have an excellent peeling prevention property, and a secondary battery including the secondary battery electrode can have an excellent electrical property and durability.

What is claimed is:

1. A copper foil comprising:
a copper layer; and
a protective layer disposed on the copper layer,
wherein a surface of the protective layer has a maximum height roughness ($R_{max}$) of 0.6 μm to 3.5 μm, a peak density (PD) of 5 to 110, and an oxygen atomic amount of 22 at% (atomic%) to 67 at%.

2. The copper foil of claim 1, wherein the protective layer includes at least one of chromium, a silane compound, and a nitrogen compound.

3. The copper foil of claim 1, wherein the copper foil has a yield strength of 25 kgf/mm² or more at a room temperature of 25±15° C.

4. The copper foil of claim 1, wherein the copper foil has an elongation of 2% or more at a room temperature of 25±15° C.

5. The copper foil of claim 1, wherein the copper foil has a yield strength ratio of 0.55 kgf/mm² or more represented by the following Equation 1:

Yield strength ratio (kgf/mm²)=Yield strength(kgf/mm²)×Elongation value, wherein, the elongation value has no unit. [Equation 1]

6. The copper foil of claim 1, wherein the copper foil has a thickness of 4 μm to 30 μm.

7. A secondary battery electrode comprising:
a copper foil; and
an active material layer disposed on the copper foil,
wherein the copper foil includes:
a copper layer; and
a protective layer disposed between the copper layer and the active material layer,
wherein a surface of the copper foil has a maximum height roughness ($R_{max}$) of 0.6 μm to 3.5 μm, a peak density (PD) of 5 to 110, and an oxygen atomic amount of 22 at% to 67 at%.

8. The secondary battery electrode of claim 7, wherein the protective layer includes at least one of chromium, a silane compound, and a nitrogen compound.

9. The secondary battery electrode of claim 7, wherein the copper foil has a yield strength of 25 kgf/mm² or more and an elongation of 2% or more at a room temperature of 25±15° C.

10. A secondary battery comprising:
a cathode;
an anode including the secondary battery electrode according to any one of claims 7 to 9;
an electrolyte configured to provide an environment in which lithium ions move between the cathode and the anode; and
a separator configured to electrically insulate the cathode from the anode.

* * * * *